United States Patent

[11] 3,625,326

[72] Inventors: Albert Rix, Wilhelmshaven; Georg Werner, Heidmuhle, both of Germany
[21] Appl. No. 15,990
[22] Filed Mar. 3, 1970
[45] Patented Dec. 7, 1971
[73] Assignee Olympia Werke AG, Wilhelmshaven, Germany
[32] Priority Mar. 3, 1969
[33] Germany
[31] P 19 10 663.9

[54] CENTRIFUGALLY CONTROLLED LOOP SPRING CLUTCH
9 Claims, 4 Drawing Figs.
[52] U.S. Cl. .................................................. 192/105 CE, 64/30 C, 192/105 CF
[51] Int. Cl. .................................................. F16d 43/24
[50] Field of Search .......................................... 192/105 AN, 105 CE, 105 BA, 103 B, 105 CP, 105 C, 105 CF; 64/15 C, 30 C, 30 D, 27 CT

[56] References Cited
UNITED STATES PATENTS
317,586 5/1885 Sheppard .................... 192/105 CD
3,165,184 1/1965 Hebert ....................... 192/105 CF Primary Examiner—Allan D. Herrmann
Assistant Examiner—Randall Heald
Attorney—Spencer and Kaye ABSTRACT: A centrifugally controlled loop spring clutch for coupling and decoupling a drive shaft to a coaxial member. The drive shaft is provided with a pair of centrifugally responsive weight members which are mounted so that they pivot in opposite directions about their pivot axes, and are coupled for movement together. Movement of the weight members causes a loop spring mounted on the coaxial member and encircling the end of the drive shaft, to be pressed against the periphery of the drive shaft to thereby couple the drive shaft to the coaxial member. The oppositely acting arrangement of the centrifugal weight members permits the forces caused by tangential accelerations due to torsional vibrations to be compensated and a smooth coupling and decoupling action to take place.

Albert Rix
Georg Werner
INVENTORS.

3,625,326

CENTRIFUGALLY CONTROLLED LOOP SPRING CLUTCH

BACKGROUND OF THE INVENTION

The present invention relates to a centrifugally controlled loop spring clutch having a speed-dependent clutch action for the smooth coupling and decoupling of two coaxial members by means of a loop spring loosely enclosing the end of the driving member and permanently connected to the driven member.

In power-driven typewriters, bookkeeping and similar machines care must be taken so that during the switching on and starting procedure the motor speed reaches a level which at a minimum is sufficiently high so that the motor, which operates through clutch, achieves the required starting torque for driving the machine or the functional groups of elements therein. Preferably, in a practical application, the torque desired is somewhat greater than the required starting torque so that the drop in speed which always results under load will not cause the motor to stall. Such measures are particularly necessary when utilizing shaded-pole motors which, due to their being rugged and inexpensive, are particularly suited for use in the above-mentioned office machines. The need for this care when utilizing such shaded-pole motors can easily be seen from their known torque-speed characteristics. Accordingly, when utilizing such a motor, the speed, under no load conditions, is permitted to increase beyond the so-called breakdown torque speed and, according to experience, to such an extent that the reduced speed developing under load conditions is still sufficiently above the breakdown torque speed. With the above-mentioned increased motor speed in the load, i.e. the machine or portions thereof, is then connected with the motor shaft by actuation of a clutch, more exactly the starting clutch.

In order to achieve proper functioning of the machine without irregularities, i.e., speed variations, when a typing or function key, depending on the type of machine, is depressed, and thus vary the load on the motor, the starting clutch must be insensitive to the drop in speed caused by the increased load or it must be made insensitive by suitable devices. Such devices are also provided to prevent the possible fluctuations in the speed of the motor caused by the type of construction of the motor, for example resulting from influences exerted by the alternating current, from producing irregularities in the performance of the machine or from causing a decoupling of the clutch.

In addition, to the above-mentioned requirements for such a clutch, it should also operate substantially noiselessly since with the presently available high state of general soundproofing in comparable office machines, noises such as would be produced by a pawl-type clutch would be considered very annoying.

In a known typewriter drive meeting a number of these requirements a centrifugal weight is provided in the loop spring starting clutch located between electromotor and machine. When the weight swings outwardly against spring pressure due to increasing speed, as inwardly disposed pressure edge or surface of the weight presses against the loose or untensioned windings of the loop spring and thus effects, through friction between the spring and the motor drive shaft, the tightening of all of the loop spring coils and the mechanical coupling of the motor to the machine element. Such a clutch meets the requirement for a starting clutch that when the nominal speed has been reached, the centrifugal force acting on the centrifugal weight as an unimpeded natural force effects the necessary pressing of the loop spring against the shaft. However, tangential accelerations occurring during speed fluctuations, either because of fluctuating loads or because of the particular characteristics of the electric drive, produce a tangential force which produces a resultant with the normal force which has a different position with respect to the shaft center point and with respect to the centrifugal weight joint so that the pressing and coupling effect of the loop spring is impeded.

SUMMARY OF THE INVENTION

It is accordingly the object of the present invention to provide a clutch device which eliminates these drawbacks and which eliminates, by simple means, the danger of decoupling during a drop in speed caused by an increased load, e.g. when keys are actuated in typewriters or similar machines or due to the characteristics of the electric drive.

This is accomplished according to the present invention in that one or a plurality of pairs of centrifugal weights are provided on the drive shaft, with the weights of each pair being arranged to rotate in opposite directions and to influence one another and the loop spring so that the tangential accelerations resulting during torsional vibrations can be compensated by the oppositely acting directions of the centrifugal weights. This results in an equalization of the contact pressure for causing the loop spring to couple the drive shaft to the driven member. In order to produce uniform cooperating outward movement of the centrifugal weights, the arrangement is such that the centrifugal weights are provided, at the adjacent portions of their arms near the bearing pins, with contour elements or surfaces which engage one another and one of these arms is provided in a known manner with a pressure edge or bearing surface which exerts pressure on the loop spring to press it against the perimeter of the drive shaft. The contour elements acting on one another are, according to one embodiment of the invention, designed as formfittingly engaged teeth, which are preferably involute teeth having equal-sized sectors.

The advantages produced with the present invention consist particularly in that the centrifugally controlled loop spring clutch can act as the starting clutch for allowing the correct torque and speed required to start the coupled machine, e.g. a typewriter, without additional pulse generators or switching components being required and that an arrangement for compensating the tangential accelerations during torsional vibrations acts on the loop spring to uniformly press and tension it, and thus protect the clutch from unintentional disengagement.

A simplified form of the present invention consists in that the adjacent arms of the centrifugal weights bear contour elements or surfaces which are in the form of force-transmitting contact edges which are in operative connection with one another and that the contact edge closer to the loop spring is associated with the arm bearing the contact or bearing surface for the loop spring. The advantage of this loop spring clutch, which is preferably employed in drives where tangential accelerations occur substantially in one direction, is that instead of the precise toothed arcs on the centrifugal weights which are expensive to manufacture, it is only necessary to have smooth curved contact edges so that the device becomes more robust and cheaper to produce.

Since both embodiments of the clutch operate without pushing parts, they operate very noiselessly. The simple device comprises only a few parts, which permits easy disassembly. In the particular structural arrangement illustrated, the loop spring, which might possibly need to be replaced, can easily be exchanged by loosening a securing disk and removing a driven pulley or gear.

In all conventional centrifugal clutches spring means are required to reset the centrifugal weights which may consist of a tension or pressure spring, and suspension or hanging brackets for the spring are also often additionally provided. In the clutch according to the invention, however, such a reset spring is not required since the bearing surface of the centrifugal weight is pressed outwardly by the loosely wound loop spring when no centrifugal force is active so that the arms of the centrifugal weights return to the starting position.

DESCRIPTION OF THE PREFERRED EMBODIMENTS

Figure 2:
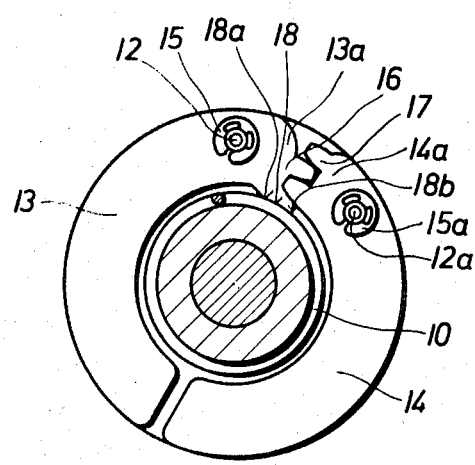
FIG. 2 is a longitudinal section of the clutch along line 2—2 of FIG. 1.
Figure 1:
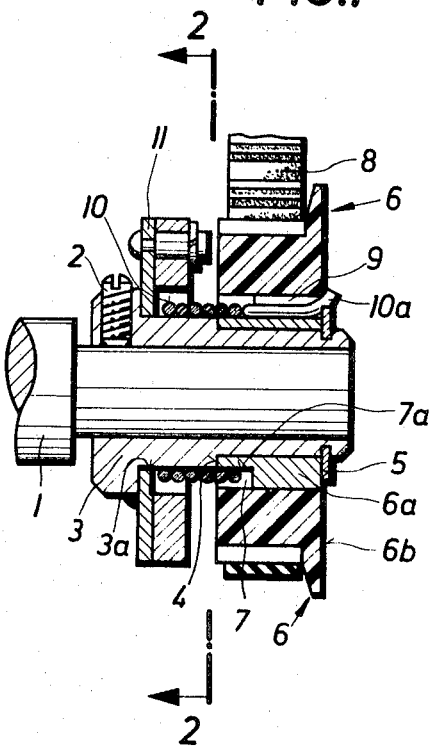
FIG. 1 is a cross-sectional view of an embodiment of a clutch according to the invention wherein the centrifugal weights are connected by involute teeth.

Referring now to FIGS. 1 and 2, there is shown a drive shaft 1 which is connected to a motor (not shown). Securely connected to the drive shaft, by means of a screw 2, is a bushing 3 on which is rotatably mounted a driven member 6. The member 6 is axially fixed on the bushing 2 by means of a turned shoulder 4 which abuts one end of the member 6 and by a securing or retaining ring 5 on the other end thereof. This driven member 6 is preferably provided in the form of a gear for a toothed belt 8 as shown, since a toothed belt 8 provides no slip for the transmission of force from the driven clutch portion to the machine drive shaft and also acts to damp shock and noise. The gear for the toothed belt is advantageously constructed so that the inner or bearing portion thereof comprises a metallic hub 6a to the outer periphery of which is fastened, in a known manner, a tread or gear portion 6b of a synthetic material in order to reduce its weights and noise. The gear, i.e. the driven member 6 for the toothed belt 8 is provided at one of its fontal sides or ends with an annular groove 7 which is so designated that its inner surface 7a, which advisably as shown, extends into the hub 6a, has the same diameter as the adjacent bushing jacket 3a. Also provided in the gear is an axial receiving bore 9 which passes through the bottom of the annular groove 7 and which is provided for the bent end 10a of a loop spring 10 which encloses or encircles the end of the shaft 1 around the inner surfaces 7a of the annular groove 7, and the bushing jacket 3a. By means of the bent end 10a, the loop spring 10 is in fixed relation to the gear or driven member 6 and rotates therewith.

The spring 10 is such a diameter when not under tension that it can freely rotate about the shaft, with little or no friction whereby no load is placed on the shaft during the starting operation. Although the driven member 6 is illustrated as a gear for a toothed belt, it is to be understood that such is by way of example only and that the driven member may take different form so long as it is coaxial with the drive shaft and contains the loop spring. For example, the driven member any be a gear from a multiple gear drive or another coaxially mounted shaft.

Mounted on one end of the bushing 3 for rotation therewith is a flange 11 on which are mounted a pair of bearing pins 12, 12a such that their axis are parallel to that of the shaft 1. Disposed on the bearing pins 12, 12a and secured thereto by means of retaining rings 15, 15*l*, respectively, are respective centrifugal weights 13, 14. The centrifugal weights 13, 14 are mounted on the pins 12, 12a intermediate the ends thereof so that they pivot in opposite directions about the pins under the influence of the centrifugal force exerted thereon when the shaft 1 rotates. Although only one pair of weights 13, 14 and bearing pins are illustrated, it is to be understood that additional pairs of such pins may be provided if desired.

Each of the short level arms 13a, 14a of the centrifugal weights or members 13, 14 is provided with a contoured surface which engages the corresponding adjacent contoured surface of the other arm of the pair. As shown in FIG. 2, each of the contoured surfaces for the short level arms 13a, 14a is in the shape of a toothed arc 16, 17 respectively, the teeth of which are in formfitting engagement with each other. Preferably as shown, the teeth for the toothed arcs 16, 17 are involute teeth having equal sectors. One centrifugal weight, e.g. weight 13, has, at its short level arm 13a and adjacent the periphery of the loop spring 10, a contact edge or bearing surface 18 whose profile is adapted to the outer circumference of the loop spring 10 when it is in its open, i.e. untensioned state.

The arc of the contact edge 18 is thus flatter than the outer circumferences of the compressed loop spring 10 so that pressure on the edges of ends 10a, 18b of the contact edge 18 against the loop spring 10 in the tensioned state is avoided.

Figure 3:
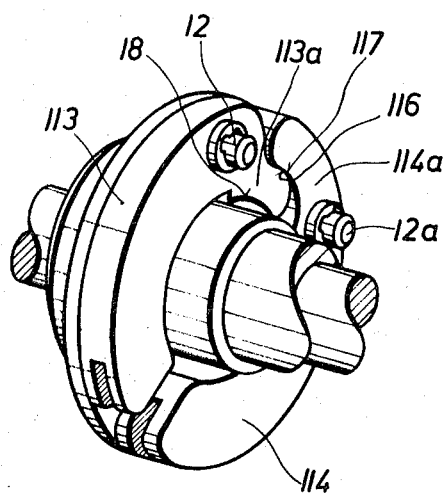
FIG. 3 is a perspective view of another embodiment of a clutch according to the invention having centrifugal weights with flat contact edges in operating connection, the loop spring not being shown.

A simplified form of an operative connection for the two (or plurality of pairs of) centrifugal weights (113, 114) is shown in FIG. 3. Instead of the formfitting connection by the toothed arcs 16, 17 there is here provided a simple force-transmitting connection in that the short level arms 113a, 114a of the two (or of the plurality of pairs of) centrifugal weights contact one another with one of the curved contact edges 116, 117, on one arm reaching over the other. The inner one, i.e., the one closest to the loop spring 10, of the two short level arms 113a, 114a is provided, on the surface toward the loop spring 10, with a contact edge 18 whose shape and function corresponds to the arrangement on arm 13 of FIG. 2.

With this embodiment, the arrangement of the centrifugal weights 113, 114 must be so selected in view of the direction of rotation, that the friction force between the contact edge 18 and the outer surface of the loop spring 10 acts in the direction away from bearing pin 12.

Figure 4:
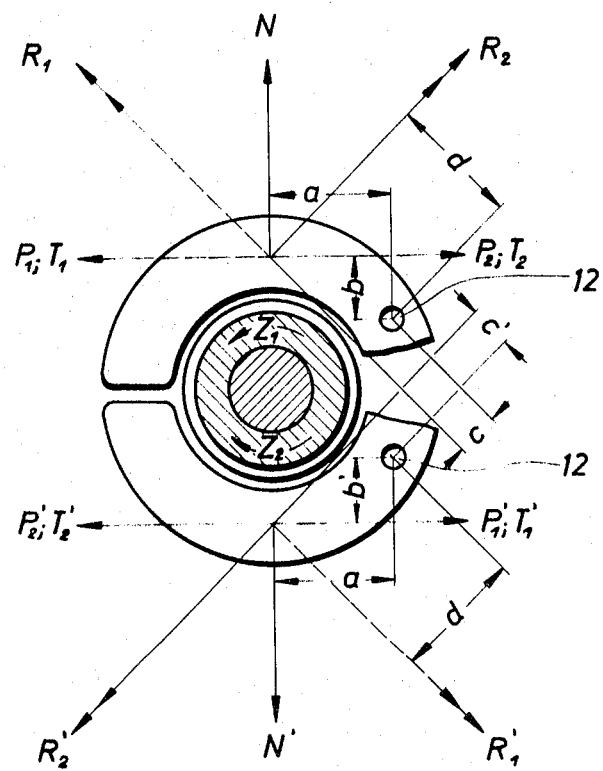
FIG. 4 is a schematic representation of the centrifugal weights illustrating the forces acting thereon and the vectors of the tangential acceleration.

In FIG. 4 there is shown an illustration of the forces exerted on the clutch according to the invention. For reasons of clarity and in order to provide a clearer illustration, the tangential accelerations $T_1$, $T_1'$, $T_2$, $T_2'$ are shown as arrows of the same size as the forces $P_1$, $P_1'$, $P_2$, $P_2'$ and the centrifugal forces $N$, $N'$. Such an illustration is practical for the reason that the forces depend on the respective speeds and on possible delays or decelerations, i.e. they are not constant.

In order to explain the operation, and referring in addition to the embodiment of FIG. 2, when the drive motor is started with its shaft 1, the centrifugal weights 13, 14 rotating therewith will pivot toward the outside.

Initially no torque is transmitted to the gear 6 since the resistance of the functional groups of elements (not shown) to be driven by it, via the belt, 8 is definitely greater than the slight friction existing between the loop spring 10 and bushing surface 3a since the spring 10 is not yet tensioned. With further increase in the speed, the centrifugal weights 13, 14 effect an increase in the pressure of the contact edge 18 against the loop spring windings thereunder in accordance with the known quadratic equation for the centrifugal force until the friction force between the spring 10 and the surface 3a becomes sufficiently great that the portion of the spring on which the pressure is exerted can no longer rotate relative to the surface 3a at which time the entire loop spring 10 quickly tensions and the clutch action is completed.

Depressing the typewriter and other operating keys and switching in other functions produces an increase in load in the machine and thus at its input shaft, which is driven by the toothed belt 8 through the gear 6. The reduction in speed connected therewith on the driven side of the clutch results in a tangential acceleration $T_1$, $T_1'$ at each of the toothed centrifugal members 13, 14 (which rotate with the dive shaft 1 which has not experienced any reduction in speed) relative to the loop spring 10 connected with the gear 6, for an assumed deceleration in the direction of the arrow $Z_1$ (FIG. 4) and also in a tangential acceleration $T_2$, $T_2'$ for an assumed deceleration in the direction of the arrow $Z_2$.

If the centrifugal weights 13, 14 are identical in shape and in the location of their centers of gravity, which is necessary to avoid imbalances, their radially directed centrifugal forces, marked $N$ and $N'$ are of the same size as are their acceleration forces $P_1$ and $P_1'$ or $P_2$ and $P_2'$, respectively. To bring this out more clearly FIG. 4 also shows the lever arms $a$ ($N$), $a'$ ($N'$) and $b$ ($P_1$, $P_2$), $b'$ ($P_1'$, $P_2'$) for pivot points 12, 12a, respectively, and also the resultants with their associated lever arms $R_1$ with $c$, $R_1'$ with $d'$, $R_2$ with $d$, $R_2'$ with $c'$. The turning moments resulting from tangential acceleration forces according to FIG. 4 cancel one another due to the counterrotating arrangement of the centrifugal weights 13, 14 while the turning moments of forces $N$ and $N'$, which, according to the above, are identical, remain active. Thus, there is no change in the contact pressure of the contact edge 18 against the loop spring 10 which can easily be understood when considering the effect of the toothed arcs 16, 17 according to FIG. 2.

The simplified form of the clutch with the force-transmitting effect of the centrifugal weights 113, 114 on one another as shown in FIG. 3 can preferably be used wherever the significant tangential accelerations appear in one direction, as shown in FIG. 4 according to the direction of arrows $T_1$, $T_1'$, which always results in interraction between the two contact edges 116, 117. When the turning moment $N' \cdot a'$ is greater than the turning moment $T_{20} \cdot b'$, the operating conditions for the tangential acceleration in the direction of arrows $T_2$, $T_2'$ are also assured and can be controlled. This is no impediment here since the driving conditions of a typewriter or similar machine are known and do not result in dynamic stresses to which the device could not be tuned.

With respect to the effect of the alternating current, which, for example, causes a change of the magnetic field four times per revolution in the motor, and thus a change in the torque and speed which could also lead to a release of the clutch, the action of the centrifugal members 13, 14 or 113, 114 and the contact edge 18 also leads to a uniform contact pressure for coupling the loop spring 10 to the shaft 1 as was described above in the discussion with respect to the depression of the keys.

It will be understood that the above description of the present invention, is susceptible to various modifications, changes and adaptations and the same are intended to be comprehended within the meaning and range of equivalents of the appended claims.

We claim:

1. A centrifugally controlled loop spring clutch having a speed-dependent clutch action for the smooth coupling in an out of engagement of two coaxial rotating members comprising:
   a. a drive shaft;
   b. a driven member coaxially mounted with said drive shaft;
   c. a normally untensioned loop spring mounted on said driven member for rotation therewith, said loop spring extending over and loosely enclosing the end of said drive shaft;
   d. at least one pair of centrifugal weight members mounted on said drive shaft for rotation therewith, each of said weight members being pivotally mounted for movement about an axis parallel to the axis of said drive shaft with the weight members of each pair moving in opposite directions about their respective axes due to centrifugal force, and being coupled together so that movement of one of said weight members influences the movement of the other weight member of each pair and,
   means responsive to the pivotal movement of said weight members for pressing said loop spring against the periphery of said drive shaft to cause said loop spring to tension and couple said driven member to said drive shaft whereby the oppositely acting arrangement of said weight members permits compensation of the forces caused by tangential accelerations during torsional vibrations of said drive shaft and said driven member.

2. The centrifugally controlled loop spring clutch defined in claim 1 wherein each of said weight members includes an arm which is pivotally mounted about a point intermediate its ends, one end of each of said arms being provided with a contoured surface which engages the corresponding surface of the adjacent end of the other arm of each pair to couple said weight member together; and wherein said loop spring pressing means includes a bearing surface formed on the end provided with said contoured surface of one arm of each pair of weight members.

3. A centrifugally controlled loop spring clutch as defined in claim 2 wherein said contoured surfaces on the ends of said centrifugal weight arms include a plurality of teeth with the teeth of the arms of each pair being in formfitting engagement with one another.

4. A centrifugally controlled loop spring clutch as defined in claim 3 wherein said teeth are designed as involute teeth.

5. A centrifugally controlled loop spring clutch as defined in claim 4 wherein said involute teeth have equal sectors.

6. A centrifugally controlled loop spring clutch as defined in claim 2 wherein said contoured surfaces engaging one another are constructed as overlapping force-transmittingly coupled edges; and wherein said bearing surface is on the one of said arms having its contact edge closer to said loop spring.

7. A centrifugally controlled loop spring clutch as defined in claim 2 wherein the centrifugal weight members of each pair are returned to their starting position, without any additional return means, by the spreading effect of said loop spring when the tension thereof is released.

8. A centrifugally controlled loop spring clutch as defined in claim 2 wherein said weight members are substantially identical in shape and in the location of their center of gravity.

9. A centrifugally controlled loop spring clutch as defined in claim 3 wherein said driven member comprises a gear rotatably mounted on the end of said drive shaft.

* * * * *